United States Patent [19]

Yamamoto

[11] Patent Number: 5,008,899
[45] Date of Patent: Apr. 16, 1991

[54] RECEIVER FOR SPECTRUM SPREAD COMMUNICATION
[75] Inventor: Michio Yamamoto, Mobara, Japan
[73] Assignee: Futaba Denshi Kogyo Kabushiki Kaisha, Mobara, Japan
[21] Appl. No.: 545,642
[22] Filed: Jun. 29, 1990
[51] Int. Cl.⁵ .............................................. H04K 1/04
[52] U.S. Cl. ...................................................... 375/1
[58] Field of Search ................................ 375/1; 380/34
[56] References Cited
U.S. PATENT DOCUMENTS
4,922,506  5/1990  McCallister et al. .................... 375/1
4,943,975  7/1990  Kurihara et al. ........................ 375/1

Primary Examiner—Salvatore Cangialosi
Attorney, Agent, or Firm—Oblon, Spivak, McClelland, Maier & Neustadt

[57] ABSTRACT

A receiver for spectrum spread communication capable of positively accomplishing synchronism between the receiver and a transmitter with simple construction. The receiver is constructed so as to carry out the synchronism of frequency hopping between the receiver and the transmitter my means of the output signal of a correlation unit.

2 Claims, 3 Drawing Sheets

RECEIVER FOR SPECTRUM SPREAD COMMUNICATION

BACKGROUND OF THE INVENTION

This invention relates to a receiver for spectrum spread communication, and more particularly to a receiver for spectrum spread communication employing a hybrid system.

Conventionally, a spectrum spread (hereinafter referred also to "SS") communication system has been developed and partially put in practice for the purpose of being utilized in various communication fields including office automation, mobile communication, remote control and the like.

The SS communication system satisfactorily exhibits a variety of significant characteristics such as crosstalk-proof characteristics, noise-proof characteristics capable of eliminating interference and the like, because it can transmit a narrow-band signal while spreading it into a broad-band signal. The SS communication system is generally classified into a frequency hopping (FH) system and a direct spread (DS) system.

The FH system is adapted to cause one bit of information to be dispersed into a number of frequencies, so that it causes the circuit construction to be highly complicated although it may exhibit resistance to fading and interference.

The DS system is simplified in circuit construction, however, it is inferior in fading characteristics and the like to the FH system.

In view of the foregoing, a hybrid system in which the FH and DS systems are used in combination with each other to effectively utilize the advantages of both is considered.

FIG. 4 is a block diagram showing a transmitter-receiver device used for a conventional hybrid SS communication system.

In FIG. 4, a base band data signal $V_{BI}$ which is a transmit data is multiplied by a pseudo-noise (PN) code generated from a PN code generator and then supplied to one of inputs of a mixer 403. The PN code is varied depending upon its applications, its band and the like; however, in general, an M-series code of tens to hundreds of bits is used for this purpose. A frequency synthesizer 401 includes a plurality of signal sources different in frequency and serves to change over output signals of a hopping pattern in response to the PB code form the PB code generator in turn and supplies them to the other input of the mixer 403. The mixer 403 carries out multiplication between the signal form the mixer 404 and that from the frequency synthesizer 401, so that a signal subject to frequency hopping may be transmitted in the form of a radio wave from a transmitting antenna 405.

The above-described transmit signal is received through a receiving antenna 406 and then supplied to one of inputs of a mixer 407. The mixer 407 carries out multiplication between a signal supplied from a mixer 408 and the above described receive signal and then supplies the resultant signal to a demodulator 411. The signal is demodulated in the demodulator 411 and then output in the form of a base-band output signal $V_{BO}$. The base-band output signal $V_{BO}$ corresponds to a base-band input signal $V_{BI}$ on the transmitter side.

A signal output from the demodulator is supplied to a synchronous circuit 412. The synchronous circuit 412 functions to control the frequency of a PN code output signal generated from the a code generator 410 so as to maximize the output signal of the demodulator 411. The PN code generator 410 is constructed in substantially the same manner as the PN code generator 402 on the transmitter side. The output signal of the PN code generator 410 is supplied to one of inputs of the mixer 408 and a frequency synthesizer 409. The frequency synthesizer 409 is constructed in the same manner as the frequency synthesizer 4101 on the transmitter side and serves to supply, to the other input of the mixer 408, a plurality of frequency signals in the same hopping pattern as on the transmitter side in response to the PN code from the PN code generator 410 in turn. The mixer 408 carries out multiplication between the signals input thereto from the frequency synthesizer 409 and PN code generator 410 and supplies the resultant signal to the other input of the mixer 407. The mixer 407, as described above, mixes the signal form the mixer 408 with the signal from the receiving antenna 406 and then supplies the resultant signal to the demodulator 411.

Synchronism is deemed to be accomplished between the hopping speed on the transmitter side and that on the receiver side when the output signal of the demodulator 411 is maximized by repeating the foregoing operation, resulting in the base-band output signal $V_{BO}$ corresponding to the base-band input signal $V_{BI}$ being obtained.

As will be noted from the foregoing, the conventional hybrid SS communication system can transmit a variety of data. However, the conventional system employs a dlay lock loop (DLL) circuit or the like as a synchronism supplementing circuit and a synchronism holding circuit, so that much time is required until synchronism is completed and it is highly difficult to establish complete synchronism.

SUMMARY OF THE INVENTION

The present invention has been made in view of the foregoing disadvantage of the prior art.

Accordingly, it is an object of the present invention to provide a receiver for SS communication which is capable of accomplishing synchronism between the receiver and a transmitter in a short period of time.

It is another object of the present invention to provide a receiver for SS communication which is capable of establishing complete synchronism between the receiver and a transmitter with simple construction.

In accordance with the present invention, a receiver for SS communication is provided. The receiver comprises a PN code generating means for generating a PN code, a frequency synthesizer means for changing over and outputting signals different in frequency in turn in response to the PN code, a mixing means for carrying out multiplication between a signal received by the receiver and the signal from the frequency synthesizer means to generate its output signal, a correlation means for carrying out correlation between the output signal of the mixing means and the PN code to output a correlation signal, and a control means for controlling the frequency of the PN code generating means in response to the correlation signal.

In a preferred embodiment of the present invention, the cycle of changing-over of the frequency synthesizer is set to be integral times as long as that of the PN code.

In the present invention constructed as described above, the synchronism of the frequency synthesizer is carried out my means of the output signal of the correlation means. Also, the cycle of changing-over of the frequency synthesizer is set to be integral times as long as that of the PN code, resulting in the synchronism being completed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
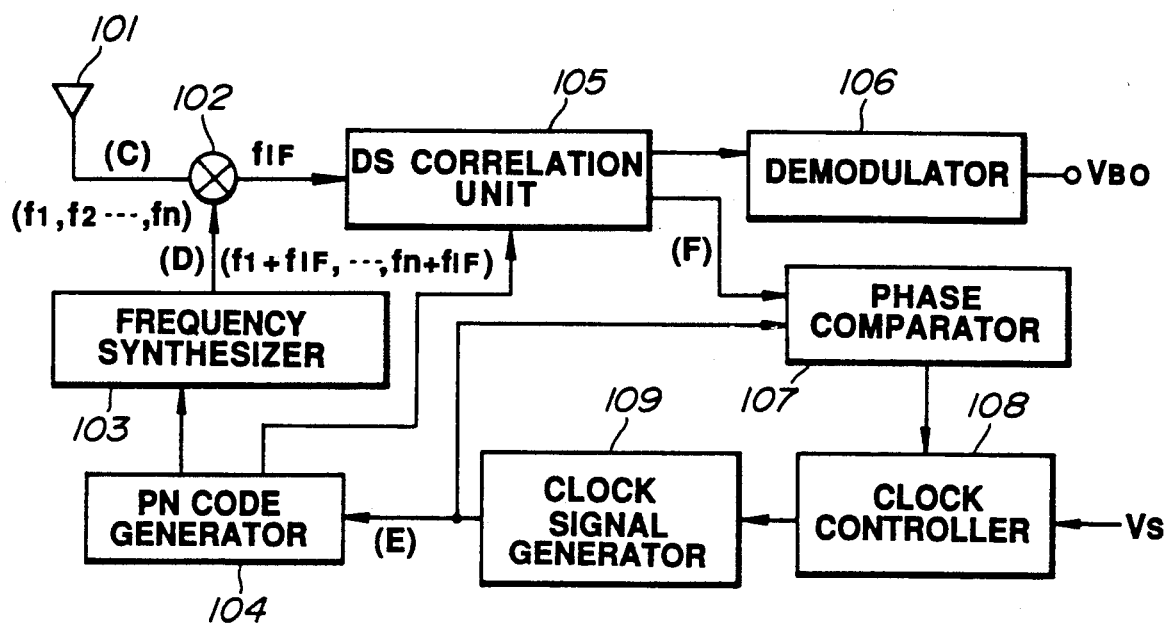
FIG. 1 is a block diagram showing an embodiment of a receiver for SS communication according to the present invention.

Now, a receiver for SS communication according to the present invention will described hereinafter with reference to FIGS. 1 to 3, wherein like reference numerals designate like or corresponding parts throughout.

Figure 2:
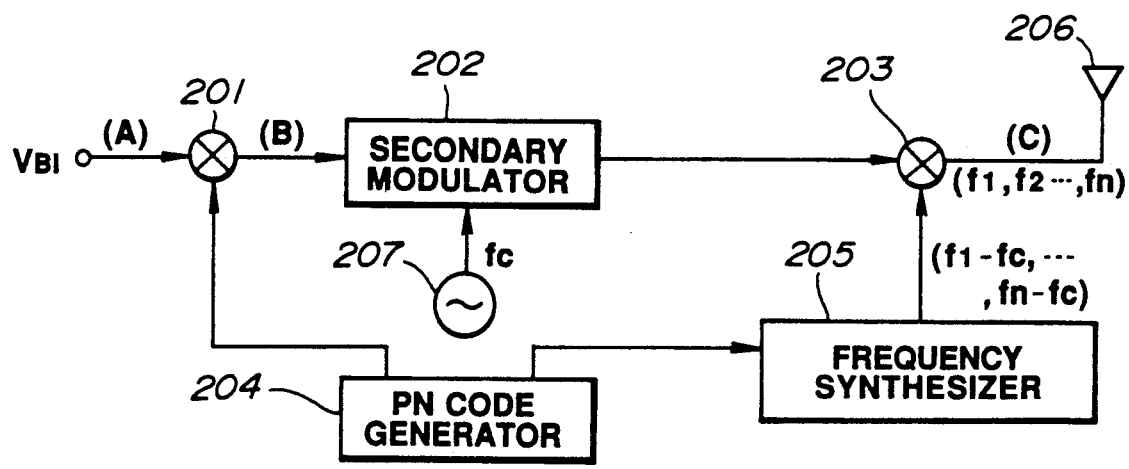
FIG. 2 is a transmitter suitable for use in connection with the present invention.
Figure 3:
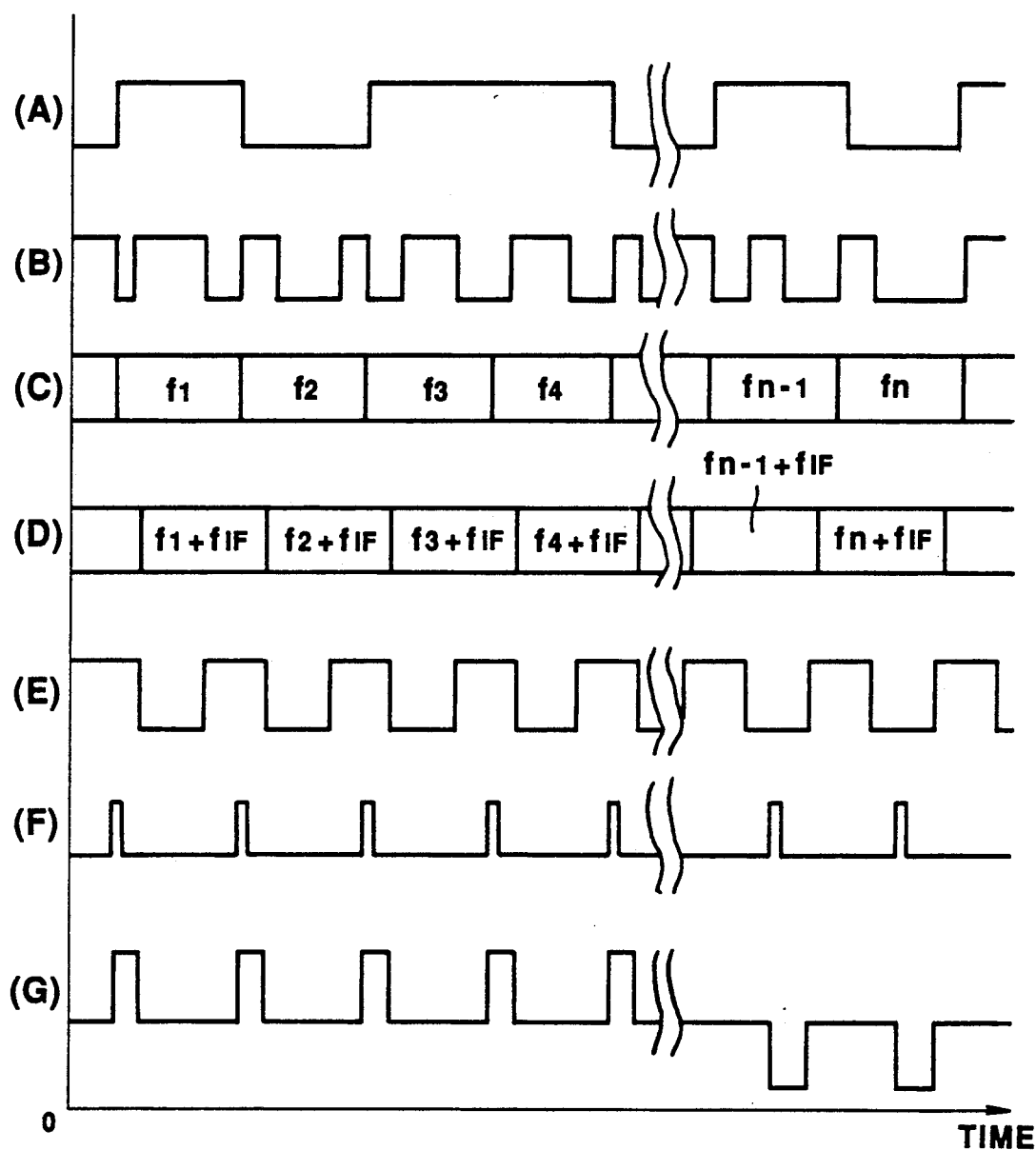
FIG. 3 is a timing chart of the receiver shown in FIG. 1.
Figure 4:
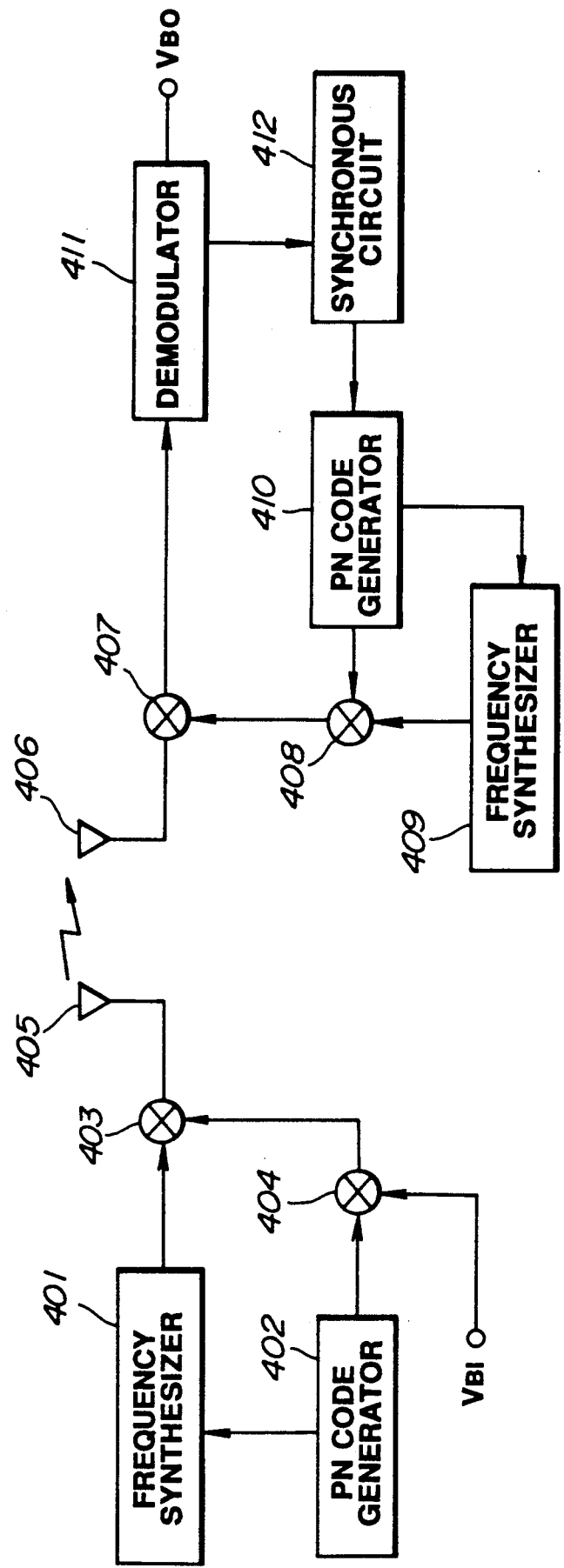
FIG. 4 is a block diagram showing a conventional transmitter receiver device.

FIG. 2 shows a transmitter for SS communication which is suitable for use in connection with the present invention. In FIG. 2, a base-band data input signal $V_{BI}$ which is a data for communication is supplied to one of inputs of a mixer 201 serving as a mixing means. Various communication data such as a digital data indicating the amount of operation of a stick in a model or industrial radio control device, a communication data for a computer and the like each may be conveniently used as the base-band data input signal $V_{BI}$. To the other input of the mixer 201 is supplied a PN code form a PN code generator 204. When a chip rate of the PN code and its code length are indicated at $T_c$ and N, respectively, the cycle of the PN code is represented by $N \cdot T_C$. These signals are subject to multiplication through the mixer 210, so that the base-band data input signal $V_{BI}$ is spread depending upon the PN code and then input to a secondary modulator 202. The secondary modulator 202 modulates a signal $f_C$ supplied thereto from an AC signal source 207 by means of a signal supplied thereto from the mixer 201, resulting in obtaining a high frequency signal, which is then supplied to one of inputs of the mixer 203. A variety of modulators such as frequency shift keying (FSK), amplitude modulation (AM), phase shift keying (PSK) and the like each may be suitably used as the modulator 202.

The PN code generated from the PN code generator 204 is input to a frequency synthesizer 205. The frequency synthesizer 205 changes over a plurality of signals $(f_1-f_c)$, $(f_2-f_c)$, ----, $(f_n-f_c)$ different in frequency in turn in response to the PN code and then outputs them. The cycle $(N \cdot T_C)$ of the PN code and the frequency changing-over cycle of the frequency synthesizer are set to be integral times so that a timing of changing over the output signals of the frequency signal 205 and the PN code may be synchronized with each other. In the illustrated embodiment, the cycle $N \cdot T_C$ of the PN code is set to be the same as the frequency changing-over cycle of the output signal of the frequency synthesizer 205, so that the cycle $N \cdot T_c$ of the PN code and the changing-over timing of the frequency synthesizer 205 may be fully equal to each other.

The output signals of the modulator 202 are subject to frequency hopping in turn by means of the output signals $(f_1-f_c)$, $(f_2-f_c)$, ----, $(f_n-f_c)$ of the frequency synthesizer 205 and then transmitted through a transmitting antenna 106. In the illustrated embodiment, the frequency hopping and the like are carried out by means of the mixer 203. However, they may be suitably realized using any one of various systems such as a system of directly transmitting the output signal of the frequency synthesizer and the like.

FIG. 1 shows an embodiment of a receiver for SS communication according to the present invention.

The signal transmitted from the transmitter shown in FIG. 2 is received through a receiving antenna 101 and then supplied to one of inputs of a mixer 102.

The mixer 102 carries out multiplication between a signal form a frequency synthesizer functioning as a frequency synthesizer means and the above-described signal received through the antenna 101, resulting in inverse spreading, and supplies the resultant signal to a direct spread (DS) correlation unit 105. The frequency synthesizer 103 outputs a signal of the same hopping pattern as that of the signal of the frequency synthesizer 205 shown in FIG. 2 and supplies signals $(f_1+f_{If})$, $(f_2+f_{If})$, ---, $(f_n+f_{If})$ different in frequency to the one input of the mixer 102 in response to a PN code from the a code generator 104 serving as a PN code generating means. The PN code generator 104 is constructed in the same manner as the PN code generator 204 shown in FIG. 2 in connection with the length of a bit and the like and generates the same PN pattern as that of the PN code generator 204, however, the former is different from the latter in that its cycle is controlled by a clock signal from a clock signal generator 109 functioning as a clock signal generating means. Also, the cycle of the PN code and the cycle of changing over of the frequency synthesizer 103 are set to be integral times while both are synchronized. Thus, in the illustrated embodiment, the receiver side is constructed in the same manner as the transmitter side in this respect, accordingly, both are set at the same cycle.

The correlation unit 105 carries out correlation between the output signal of the mixer 102 and the PN code to output a correlation signal. The correlation signal is then supplied to a demodulator 106 serving as a demodulating means and one of inputs of a phase comparator 107 serving as a phase comparing means. The demodulator 106 is provided in correspondence to the modulator 202 on the transmitter side shown in FIG. 2 and functions to demodulate its input signal to output a base-band output signal $V_{BO}$ corresponding to the base-band input signal $V_{BI}$ shown in FIG. 1. The demodulator 106 is eliminated when the secondary modulator 202 is not provided on the transmitter side.

The phase comparator 107 functions to carry out comparison between the correlation signal from the correlation unit 105 and the clock signal from the clock signal generator 109 and supply a signal corresponding to the difference therebetween to a clock controller 108 serving as a clock controlling means. The clock controller 108 supplies a clock control signal corresponding to its input signal to a clock signal generator 109. The clock controller 108 includes a control terminal, through which a forced signal $V_S$ for supplementing the synchronism is input to the clock controller 108. The clock signal generator 109 supplies a clock signal of a frequency corresponding to the clock control signal to the PN code generator 104 and the other input of the phase comparator 107. In the illustrated embodiment, the phase comparator 107, clock controller 108 and clock signal generator 109 constitute a control means.

Now, the manner of operation of the receiver of the illustrated embodiment constructed as described above will be described hereinafter with reference to FIGS. 1 to 3.

When a base band input signal $V_{BI}$(A) is input to the transmitter, a signal (B) is obtained by direct spreading as described above and then subject to modulation and frequency hopping (FH), resulting in a signal (C) being transmitted through the antenna 206.

The receiver of the illustrated embodiment receives the signal (C) through the antenna 101. An initial process for supplementing synchronism on the receiver side will be described hereinafter.

In FIG. 1, a forced signal $V_S$ of a predetermined level is input to the clock controller 108 in association with turning-on of the receiver. The clock controller 108 controls the clock signal generator 109 so that a clock signal (E) of a frequency lower than a synchronous frequency may be output from the clock signal generator 109 in response to the forced signal $V_S$. In synchronism with the clock signal (E) generated form the clock signal generator 109, the PN code generator 104 supplies a PN code to the frequency synthesizer 103. This results in the speed of frequency hopping on the receiver side being reduced as compared with that on the transmitter side. Keeping of such situation causes the phase of the transmitter to coincide with that of the receiver at certain time, so that such a peak as shown in FIG. 3(F) appears on the output signal of the correlation unit 105, resulting in the synchronism being carried out. At this time, supplementing of the synchronism is completed by removing the forced signal $V_S$.

Now, a process of holding the synchronism will be described hereinafter.

The signal received by the receiver, as shown in FIG. 3(C), is a time-series signal which has been subject to hopping by means of the output signals $f_1 - f_n$.

In synchronism with the clock signal (E) from the clock signal generator 109, the PN code generator 104 supplies a PN code to the frequency synthesizer 103. The frequency synthesizer 103, in response to the PN code thus supplied thereto, supplies a signal (D) to the mixer 102. The signal (C) is multiplied by the output signal (D) of the frequency synthesizer 103 through the mixer 102 and then output therefrom in the form of a constant intermediate-frequency signal $f_{IF}$.

The output signal of the mixer 102 is subject to correlation to the PN code of the PN code generator through the correlation unit 105 and output therefrom in the form of a correlation signal (F). The phase comparator 107 carries out comparison between the phase of the correlation signal (F) and that of the clock signal (E) to detect a phase error therebetween and supplies a signal (G) corresponding to the phase error to a clock controller 108. In this instance, as will be noted from the signals (C) and (D), in connection with the signals $f_1 - f_4$ and the signals $(f_1 + f_{IF}) - (f_4 + f_{IF})$ corresponding thereto, a timing of hopping on the receiver side is delayed as compared with that on the transmitter side, resulting in the signal (G) which is positive being output. In response to the signal (G), the clock controller 108 controls to vary the frequency of the clock signal generator 109, to thereby reduce the phase error. More particularly, it controls to increase the frequency of the clock signal (E), so that holding of the synchronism may be accomplished. On the contrary, when the phase on the receiver side is in advance of that on the transmitter side as indicated at the signals signals $f_{n-1}$ contained in the signal (C) and the signals $(f_{n-1} + f_{IF})$ and $(f_n + f_{IF})$ contained in the signal (D) corresponding thereto, the level of the output signal (G) of the phase comparator 107 is inverted. In response to the inversion, the clock controller 108 controls to lower the frequency of the clock signal (E), so that the synchronism may be held. Repeating of the above-described process permits the synchronism of frequency hopping between the transmitter and the receiver to be held, so that the base-band data output signal $V_{BO}$ corresponding to the base-band data input signal $V_{BI}$ may be obtained.

As can be seen from the foregoing, in the illustrated embodiment, the synchronism of frequency hopping between the transmitter and the receiver is carried out by means of the output signal of the correlation unit 105, so that the synchronism operation may be facilitated with simple construction while eliminating the necessity of separately providing a DS synchronous circuit and a FS synchronous circuit. Also, the cycle of changing-over of the frequency synthesizer and the cycle of the PN code are set to be integral times; accordingly, when the synchronism is so carried out that the output signal of the correlation unit 105 is optimized, synchronism between the FH section and the DS section is accomplished, to thereby facilitate the synchronism operation. Further, in the illustrated embodiment, the DS system and FH system are used in combination with each other, the processing gain corresponds to the product of both systems, resulting in being improved as compared with that obtained according to any one of the systems.

The illustrated embodiment has been described in connection with a transmitter-receiver device using a radio wave, however, it may be applied to a transmitter-receiver device using an electric cable. Also, the use of a matched filter as the DS correlation unit permit the synchronism to be detected at a high speed.

As described above, the receiver for SS communication according to the present invention is constructed so as to control the cycle of changing-over of the frequency synthesizer by means of the output signal of the DS correlation unit, to thereby obtain the synchronism, so that the synchronism may be positively accomplished.

Also, the receiver of the present invention employs the hybrid system in which the DS system and FH system are used jointly, so that the processing gain corresponds to the product of both systems, to thereby be improved as compared with that obtained according to any one of the systems.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A receiver for spectrum spread communication comprising:
   a PN code generating means for generating a PN code;

a frequency synthesizer means for changing over and outputting signals different in frequency in turn in response to said PN code;

a mixing means for carrying out multiplication between a signal received by the receiver and the signal form said frequency synthesizer means to generate its output signal;

a correlation means for carrying out correlation between the output signal of said mixing means and said PN code to output a correlation signal; and a control means for controlling the frequency of said PN code generating means in response to said correlation signal.

2. A receiver as defined in claim 1, wherein the cycle of changing-over of said frequency synthesizer and the cycle of said PN code are set to be integral times.

* * * * *

UNITED STATES PATENT AND TRADEMARK OFFICE
CERTIFICATE OF CORRECTION

PATENT NO. : 5,008,899
DATED     : April 16, 1991
INVENTOR(S) : Michio Yamamoto

It is certified that error appears in the above-identified patent and that said Letters Patent is hereby corrected as shown below:

On the title page:

The Foreign Application Priority Data has been omitted, should be, --July 3, 1989  [JP]  JAPAN...........1-171599--.

Signed and Sealed this

Thirteenth Day of October, 1992

Attest:

DOUGLAS B. COMER

*Attesting Officer*     Acting Commissioner of Patents and Trademarks